Jan. 9, 1940.  W. F. BOLDT ET AL  2,186,321
BRAKE ACTUATING CAM
Filed Jan. 15, 1938  2 Sheets-Sheet 2
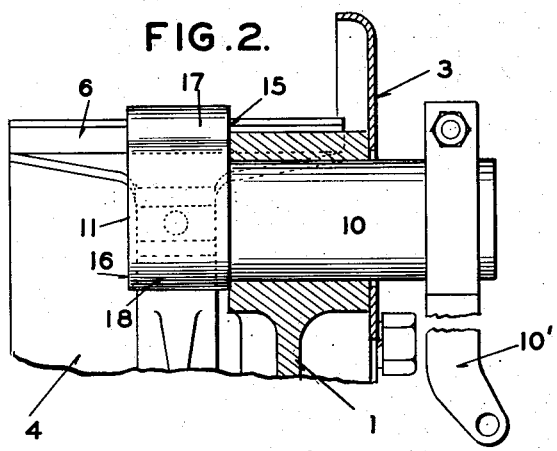
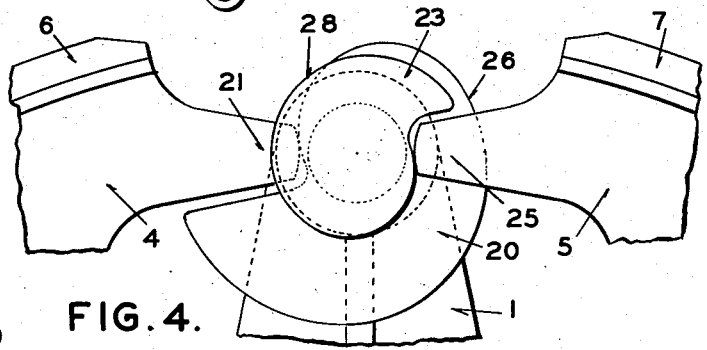
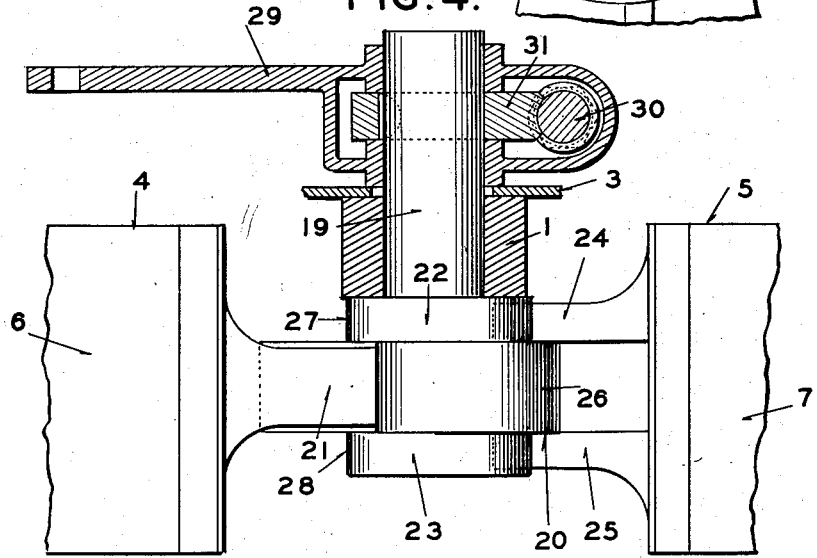
INVENTORS
W.F. BOLDT
S. SCHNELL
BY
ATTORNEY Patented Jan. 9, 1940

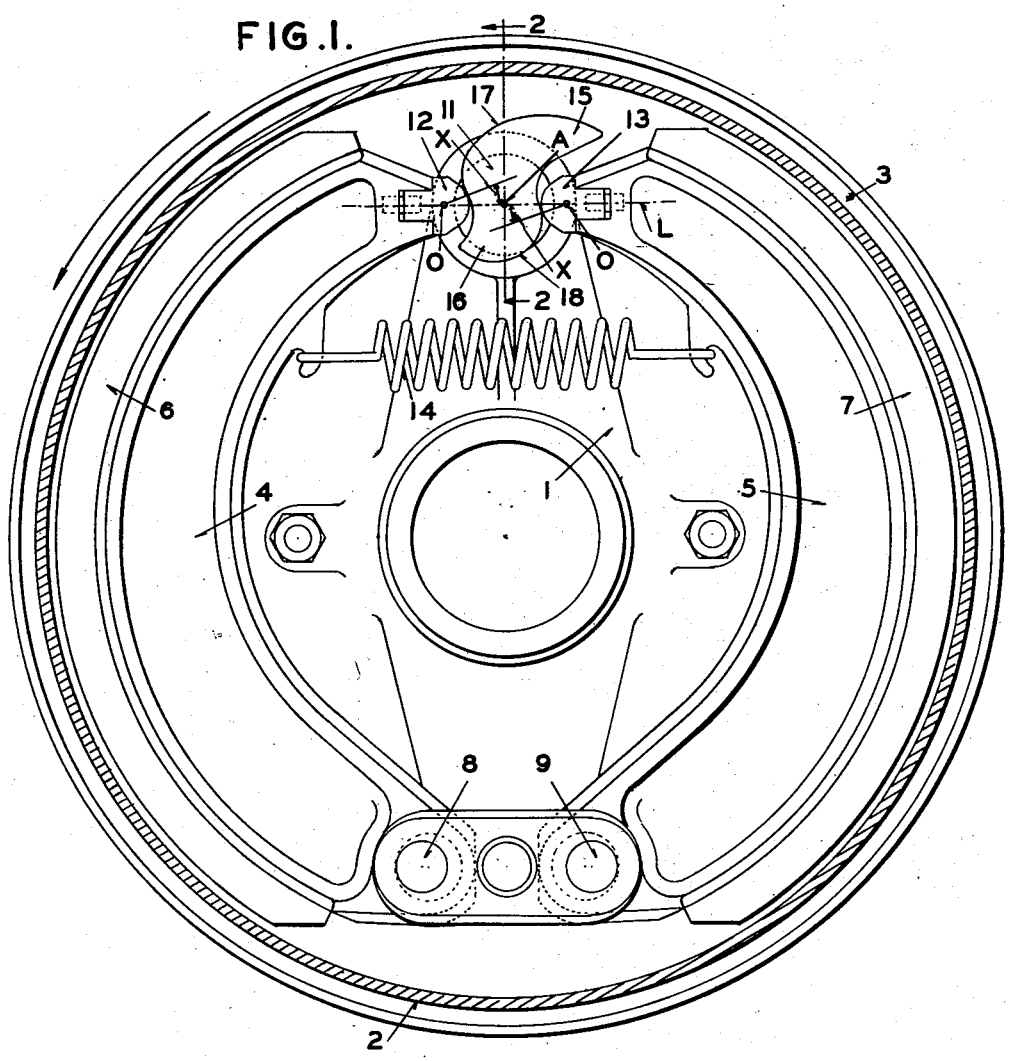

2,186,321

UNITED STATES PATENT OFFICE 2,186,321

BRAKE ACTUATING CAM

Werner F. Boldt, Overland, and Steve Schnell, St. Louis, Mo., assignors to Wagner Electric Corporation, St. Louis, Mo., a corporation of Delaware Application January 15, 1938, Serial No. 185,118

8 Claims. (Cl. 188—78)

Our invention relates to braking mechanism and more particularly to fixed axis cam means for actuating the brake shoes thereof.

One of the objects of our invention is to so construct a cam means which is rotatable on a fixed axis that it will actuate the adjacent brake shoe ends of a pivoted two shoe brake in substantially the same manner as would be done by a fluid motor or equivalent floating actuating means.

Another object of our invention is to so construct a rotatable cam means for actuating adjacent brake shoe ends that the actuating surfaces thereof will have a very gradual pitch and the shaft upon which the cam is mounted will be permitted to have a large angle of rotation in actuating the shoes.

Still another object of our invention is to so construct a cam surface and the cooperating end of a brake shoe to be actuated thereby that the direction of the actuating force on the shoe will be such as to cause the shoe to have a greater torque output for a given actuating force than that of a shoe receiving its actuating force from prior cam constructions.

Other objects of our invention will become apparent from the following description taken in connection with the accompanying drawings in which Figure 1 is a side view of a brake assembly showing our improved cam actuating means embodied therein; Figure 2 is a cross-sectional view taken on the line 2—2 of Figure 1; Figure 3 is a side view of a modified cam construction; and Figure 4 is a top view, partly in section, of the cam construction of Figure 3 and the means for rotating the cam construction.

Referring to Figures 1 and 2, numeral 1 indicates the brake shoe support which is fixed to a suitable rigid member as the axle support of the vehicle and 2 is a drum fixed to the wheel of the vehicle and having its open side enclosed by a suitable cover plate 3 carried by the support 1. Within the drum are brake shoes 4 and 5 positioned in end-to-end relation and carrying suitable friction linings 6 and 7 for cooperation with the drum. The lower end of shoe 4 is pivotally mounted on support 1 by an adjustable anchor pin 8 and the lower end of shoe 5 is pivotally mounted on support 1 by an adjustable anchor pin 9.

A rotatable shaft 10 is journaled in the support in a manner preventing lateral movement and projects into the space between the upper adjacent ends of the shoes 4 and 5 and is provided with an S type cam 11 for cooperation with these ends of the shoes to thereby actuate the shoes into engagement with the drum when the shaft is rotated through suitable linkage including the arm 10' on its exterior end. The shoe ends are provided with suitable wear plugs 12 and 13 for engaging the actuating surfaces of the cam. The shoes are held in their retracted position by the cross spring 14.

The cam 11 is of special construction and embodies two operating lobes 15 and 16 for actuating the shoes. The lobe 15 is adapted to actuate shoe 4 which for the direction of rotation shown by the arrow is normally the "forward" shoe and the lobe 16 is adapted to actuate shoe 5 which is normally the "reverse" shoe.

In a brake assembly having brake shoes mounted as described and which is commonly known as a pivoted two shoe brake, lining 6 on the "forward" shoe will wear at a greater rate than the lining on the reverse shoe when the shoes are actuated with substantially equal applying force, as for example, by a fluid motor or a floating cam, because the "forward" shoe is subject to a self-energizing effect resulting from the direction of drum rotation.

In order that the brake shoes may be applied to the drum by a rotatable cam having a fixed axis and thus produce substantially the same output as they would if actuated by a floating means, the pitch of the cam surface 17 on lobe 15 and the pitch of cam surface 18 on lobe 16 is designed so as to have a definite relation to each other. As shown in Figure 1, the pitch (that is, the rise per angle) of the surface 17 is considerably greater than that of surface 18. Also the pitch of each surface 17 and 18 is uniform. Thus for each angle of rotation of each cam throughout its operative range the shoe actuated thereby will be moved a predetermined uniform distance. The ratio of the two pitches may vary slightly from 1:2.5 to 1:3.5, depending upon the particular brake design. In the design shown this ratio is approximately 1:3.3. With this ratio the cam surface 17 will maintain substantially the same pressure on shoe 4 as that maintained on shoe 5 by cam surface 18 and, although the lining on shoe 4 will wear more rapidly than that on shoe 5, this will not affect the pressures applied to the shoes since the pitch of cam surface 17 is so calculated that it will compensate for this as the cam shaft is rotated. Since the drum very seldom rotates in a direction reverse to that indicated by the arrow, it is unnecessary in designing the cam for practical purposes to consider the more rapid wear of the lining of the normally "reverse" shoe under these conditions.

Another important feature of the construction is the relationship between each cam surface and the plugs 12 and 13 constituting the ends of the shoes in engagement with the cam. As shown in the drawings, the outer surfaces of the plugs are arcuate with their centers O lying on a line L passing through the axis A of rotation of the cam when the cam is in its "off" or inoperative position. The cam surfaces 17 and 18 contact the arcuate surfaces of the plugs at a point off the line L, the point of contact between the surface 17 and plug 12 being above the line L and the point of contact between th surfac 18 and plug 13 being below the line L. Each cam surface and the cooperating arcuate surface of the plug is so designed that the angle between line L and the radius drawn from the point of contact to the center O, (designated as angle X) is never smaller than 13 degrees when the cam is operative to engage the shoes with the drum and may vary from this value up to approximately 35 degrees, depending upon the rotative position of the cam surface when operative and the particular brake design. For the best operative characteristics of the brake, it has been found that the greater angle should be present during the initial movement of the cam and the angle decrease as the cam is rotated. The relationship between the cam surfaces and the arcuate surfaces of the plugs results in an improved braking action of the shoes. The normally "reverse" shoe 5 when actuated into engagement with the drum will be caused to "open up," that is, have an increase in its radius of curvature due to the fact that the cam surface 18 tends to force the end of shoe 5 upwardly and outwardly which will cause the upper end of the shoe to engage the drum with greater intensity and permit the shoe to have some self-energizing action, thus resulting in a greater braking action than if the force were applied along the line L as has been done in the past. On the other hand, the cam surface 17 will tend to force the end of shoe 4 downwardly and outwardly which will relieve the toe pressure on the shoe and permit the shoe lining to be of greater length which will increase the self-energization of this shoe and thus increase its output.

Referring to the modification shown in Figures 3 and 4, the rotatable operating shaft 19 is journaled in the support 1 in a manner preventing lateral movement and extends between the adjacent ends of shoes 4 and 5. The shaft has secured thereon a cam 20 which is adapted to actuate the normally "forward" shoe 4 by means of the projection 21 on the end of the shoe. Also secured on the shaft on opposite sides of cam 20 are similar cams 22 and 23 which are adapted to actuate the normally "reverse" shoe 5 by means of the spaced projections 24 and 25 on the end of the shoe. The construction is such that the forces acting on the cam shaft when the cams are operated to apply the brake shoes are balanced and there is no force tending to "cock" the cam shaft in its bearing. Also when the cams are in their normally inoperative position, the ends of the shoes are maintained against any excessive lateral movement by the cams and the projections.

The shaft 19 is rotated by means of a lever arm 29 connected by suitable mechanism with an operating member (not shown). In order to provide adjustment between the arm and shaft, the arm carries a screw 30 which cooperates with a gear 31 fixed to the shaft. By turning the screw, the arm can be moved relatively to the shaft.

The positioning of the cams on the shaft in the manner shown permits them to have an actuating surface extending over a large angle, thus giving them a large working range which is found to be very desirable under certain conditions, as for example, where full lining wear is desired with heavy or thick linings. Also the cam shaft and operating mechanism can be made lighter due to reduced stresses. The actuating surface 26 of cam 20 and the actuating surfaces 27 and 28 of cams 22 and 23 are shown as extending over substantially 300 degrees but this may be varied if desired. The pitch of the actuating surface 26 and that of the actuating surfaces 27 and 28 are so related that the shoes will be forced into engagement with the drum in the same manner as already described with respect to the S cam of Figure 1. Due to the fact that the actuating surfaces extend over a large angle, the rise per angle or pitch, of course, is not as great as in the S cam.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In braking mechanism, a support, a drum, two brake shoes pivotally mounted on the support for cooperation with the drum and having adjacently positioned ends, friction linings carried by the shoes, and cam means rotatable on an axis fixed with respect to the support and adapted to actuate the adjacent ends of the shoes into engagement with the drum, the pitch of the actuating surface of the cam means which cooperates with the end of one of the shoes being greater than the pitch of the actuating surface of the cam means which cooperates with the end of the other shoe and the pitch of each of the actuating surfaces of the cams being uniform throughout its operative range.

2. In braking mechanism for a vehicle, a support, a rotatable drum, two brake shoes within the drum and having adjacently positioned ends, means for pivotally mounting the other ends of the shoes on the support, friction linings carried by the shoes, said shoes being normally "forward" and "reverse" shoes when the drum is rotating in the forward direction of the vehicle, a rotatable shaft journaled against lateral movement on the support, and cam means fixed to the shaft and provided with cam surfaces cooperating with the adjacent ends of the shoes for actuating them into engagement with the drum when the shaft is rotated, each of the cam surfaces having a uniform pitch throughout its operative range and the cam surface which cooperates with the normally "forward" shoe having such a greater pitch than the cam surface which cooperates with the normally "reverse" shoe that the cam surfaces will apply substantially equal forces to the shoes throughout the life of the lining.

3. In braking mechanism for a vehicle, a support, a rotatable drum, two brake shoes within the drum and having adjacently positioned ends, means for pivotally mounting the other ends of the shoes on the support, friction linings carried by the shoes, said shoes being normally "forward" and "reverse" shoes when the drum is rotating in the forward direction of the vehicle, a rotatable shaft journaled against lateral movement on the support, and cam means fixed to the shaft and provided with cam surfaces cooperating with the adjacent ends of the shoes for actuating them into engagement with the drum when the shaft is rotated, each of the cam surfaces having a uniform pitch throughout its operative range and the cam surface which cooperates with the normally "forward" shoe having a greater pitch than the cam surface which cooperates with the normally "reverse" shoe and the ratio between the pitches of the cam surfaces being between 1:2.5 and 3.5.

4. In braking mechanism for a vehicle, a support, a drum, two brake shoes pivotally mounted on the support for cooperation with the drum and having adjacently positioned ends, one of said shoes being a normally "forward" shoe and the other a normally "reverse" shoe when the drum is rotating in the forward direction of the vehicle, friction linings carried by the shoes, a shaft journaled against lateral movement on the support and extending between the adjacent ends of the shoes, a cam fixed to the shaft and cooperating with the end of one of the shoes, a second cam fixed to the shaft and cooperating with the end of the other shoe, said cams being provided with actuating surfaces extending over an angle greater than 180 degrees, the pitch of the actuating surfaces of each of said cams being uniform throughout its operative range and said pitches so related to each other that the shoes will have substantially the same force applied to them throughout the life of the linings.

5. In braking mechanism, a support, a drum, a friction element mounted on the support for cooperation with the drum and having adjacently positioned ends, a brake operating shaft extending between the adjacent ends of the friction means, a cam fixed to the shaft and cooperating with one of the ends only of the friction means, and a cam fixed to the shaft adjacent the first named cam and adapted to cooperate with the other end only of the friction means, the actuating surfaces of said cams extending over an angle greater than 180 degrees.

6. In braking mechanism, a support, a drum, a friction means mounted on the support for cooperation with the drum and having adjacently positioned ends, a brake operating shaft extending between the adjacent ends of the friction means, a cam fixed to the shaft and cooperating with one of the ends only of the friction means, and a cam on each side of the first named cam and fixed to the shaft and each adapted to cooperate with the other end only of the friction means, the actuating surfaces of all of said cams extending over an angle greater than 180 degrees.

7. In brake actuating mechanism, a support, a drum, a friction means mounted on the support for cooperation with the drum and having adjacently positioned ends, one of said ends of the friction means being provided with a single projection and the other of said ends being provided with a pair of spaced projections, a shaft extending between the adjacent ends of the friction means, a single cam member fixed to the shaft and cooperating with the single projection on the first named end of the friction means, and a cam on each side of the first named cam and fixed to the shaft, each of said last named cams adapted to cooperate with one of the projections on the other end of the friction means, said cams being provided with actuating surfaces each having a uniform pitch and extending over an angle greater than 180 degrees, the single projection on the one end of the friction means lying between the two outer cams and the two projections on the other end of the friction means lying on each side of the central cam in the inoperative positions of the cams, and means for rotating the shaft.

8. In braking mechanism for a vehicle, a support, a rotatable drum, a brake shoe, means for pivotally mounting the end of the brake shoe on the support, a rotatable shaft mounted on the support adjacent the other end of the shoe and having a fixed axis, and a cam fixed to said shaft and having a cam surface for cooperating with the end of the brake shoe to actuate it into engagement with the drum, the end of said shoe being provided with an arcuate surface and being so related to the cam surface that the point of contact between the arcuate surface and the cam surface during the actuation of the shoe will lie on a radius of the arcuate surface that at no time is at an angle less than 13 degrees with a line passing through the axis of the shaft and the center of the arcuate surface.

WERNER F. BOLDT.
STEVE SCHNELL.